United States Patent [19]
Benuzzi, deceased et al.

[11] Patent Number: 4,756,218
[45] Date of Patent: Jul. 12, 1988

[54] METHOD OF CUTTING PANELS OR STACKS OF PANELS AND CUTTING MACHINE ACCORDING TO SAID METHOD

[76] Inventors: Gino Benuzzi, deceased, late of Bologna; by Piergiorgio Benuzi, heir-at-law, 5, Via Angelo Custode, Bologna, both of Italy

[21] Appl. No.: 881,558

[22] Filed: Jul. 3, 1986

[30] Foreign Application Priority Data

Jul. 3, 1985 [IT] Italy ................. 12532 A/85

[51] Int. Cl.⁴ .............................. B23B 37/00
[52] U.S. Cl. ........................ 83/51; 83/471.1; 144/3 R; 144/376
[58] Field of Search ............ 144/1 R, 2 R, 3 R, 369, 144/376, 379; 83/35, 36, 49, 13, 102.1, 477, 477.1, 477.2, 862–865, 861, 875, 879

[56] References Cited

U.S. PATENT DOCUMENTS 4,174,745  11/1979  Benuzzi ........................ 144/3 R
4,181,164  1/1980   Meniconi ...................... 144/3 R
4,534,256  8/1985   Benuzzi ........................ 144/3 R

FOREIGN PATENT DOCUMENTS 2159427  6/1973  Fed. Rep. of Germany .......... 83/51

Primary Examiner—W. Donald Bray
Attorney, Agent, or Firm—Pollock, Vande Sande & Priddy

[57] ABSTRACT

A method of cutting panels with or stacks of panels a circular cutting saw to effect extremely neat and rapid cuts with no splintering. The saw cuts a panel in two steps, first by acting thereon through a portion of its thickness during a horizontal stroke, and then through the remaining portion of its thickness during the reverse stroke, while the direction of rotation of the saw remains unchanged and is such that the teeth thereof act successively on the two faces of the panel and press them inwardly of said panel. The saw is precisely adjustable both horizontally and vertically. Before being positioned for the first cutting step, it is displaced both vertically and horizontally to effect on the side of the panel where the cutting stroke is initiated and terminated one or more incisions compressing the panel material inwardly thereby, avoiding splintering during the subsequent cutting operations.

6 Claims, 3 Drawing Sheets

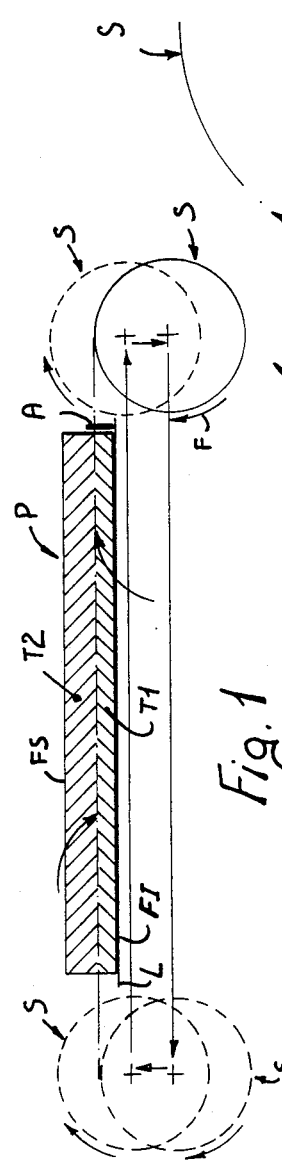
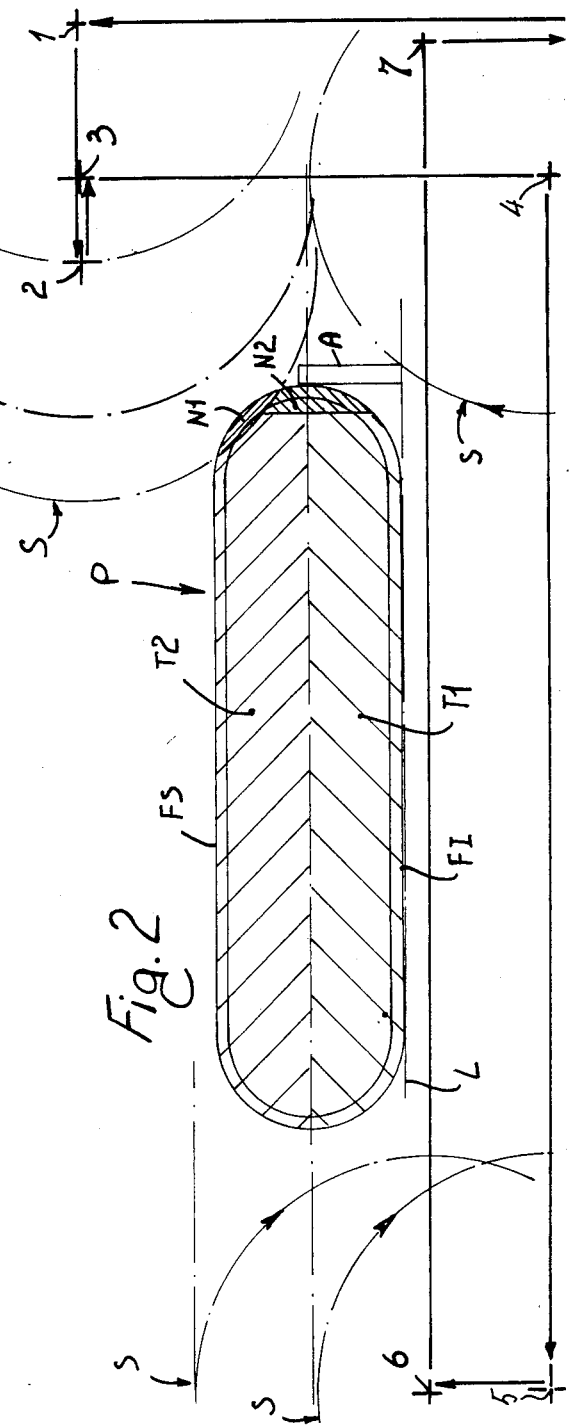

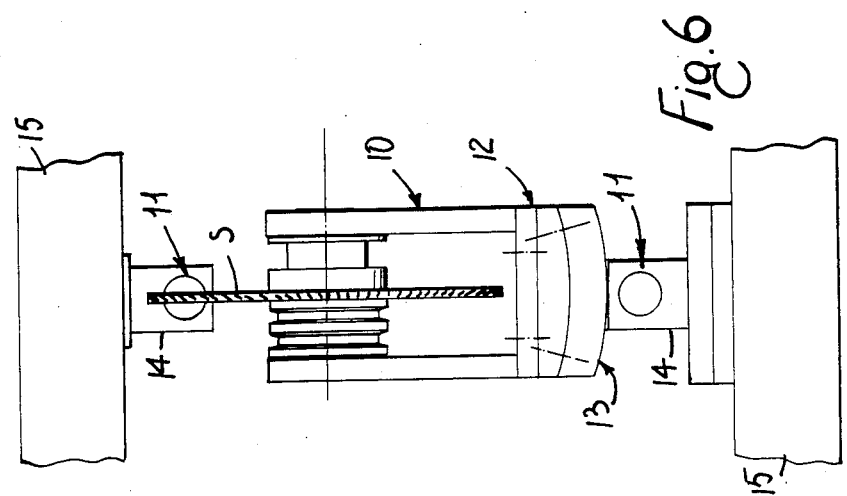
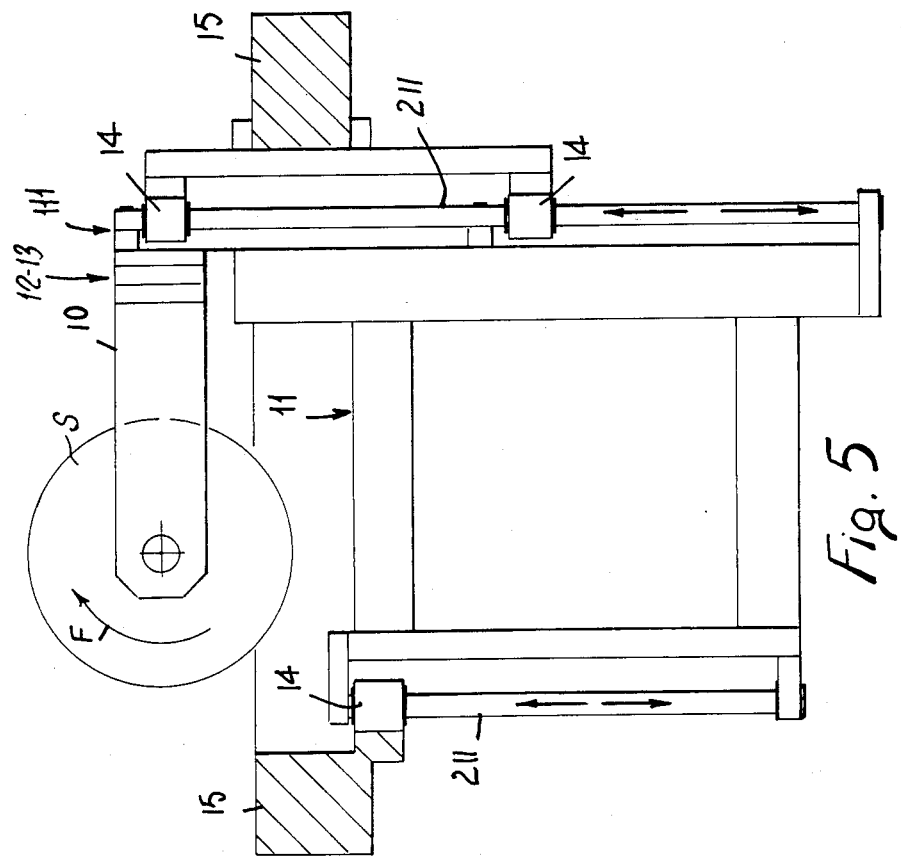

METHOD OF CUTTING PANELS OR STACKS OF PANELS AND CUTTING MACHINE ACCORDING TO SAID METHOD

SUMMARY OF THE INVENTION

In order to avoid the formation of splintering or other irregularities during the cutting, by means of a circular blade, of panels or stacks of panels made either of wood or derivatives thereof, especially if veneered with a laminate or decorative paper, there is presently provided, in advance of the circular saw, at least one scoring or grooving member which forms, on the surface of the panel from which the teeth of the saw will exit and which surface would hence be used outwards with resulting splintering, an aligned groove of dimensions such that the saw teeth will exit in a region of material which is defined at its sides by the edges of the incision groove, thus obviating the formation of said irregularities. The direction of rotation of said scoring or grooving member is such as to compress the material of the panel inwards. In case of particularly delicate material, e.g., when cutting panels coated with synthetic material to be used for kitchen furniture, said panels being defined by particularly contoured edges, a second scoring member is often used and is especially designed to operate on the edge, or edges, of the panel which would be urged outwards by the teeth of the circular saw.

The use of said scoring members requires precision working and creates setup problems. When these tools are to be sharpened or replaced, and then are to be set up in line, such an operation must be performed by highly skilled personnel and is extremely time-consuming.

This invention aims to obviate these disadvantages by completely eliminating said scoring members and by using only the cutting saw with a new procedure.

BRIEF DESCRIPTION OF THE DRAWINGS

The characteristics of this invention and the advantages resulting therefrom will be apparent from the following description of several preferred embodiments thereof, shown by way of example in the accompanying drawings, wherein:

FIG. 1 is a diagrammatic side elevational view of the cutting saw during the main movements in each cutting cycle;

FIGS. 2 and 3 show the working steps of the saw on panels having rounded edges;

FIGS. 5 and 6 are diagrammatic side elevational and top plan views, respectively, of the saw-supporting carriage on an improved sawing machine according to the invention.

DESCRIPTION OF THE PREFERRED EMBODIMENT

Figure 4:
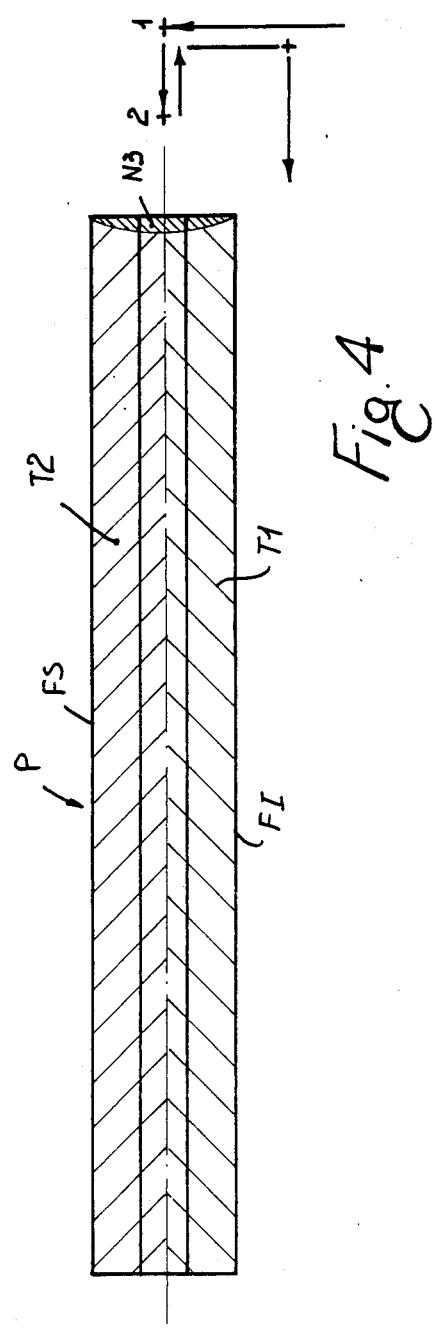
FIG. 4 shows the working steps of the saw on a panel or stack of panels having planar and vertical edges.

With reference to FIG. 1, P indicates a panel or stack of panels as seen across the thickness thereof. In the case of FIG. 1, the panel P rests on a horizontal working table L, is clamped upstream and downstream of the cutting line by suitable conventional means (not shown), and is cut by means of a circular saw S having its axis of rotation below said table L and located, when at rest, on the right side of said panel.

According to the invention, the cutting of the panel P is effected by the circular saw S alone, which has a radius larger than the thickness of said panel P and has teeth so inclined as to compress the material of the lower surface FI of said panel P inwards of said panel when the saw is rotated in the direction of the arrow F and is moved with a leftward translatory displacement as seen in FIG. 1. According to the invention, the saw S is mounted on its horizontal-displacement carriage and can be displaced vertically and with precision, for example through digital control means.

The saw S will cut the panel P, not completely during its displacement from right to left, as in the prior art, but in two strokes, namely forwards and backwards. While moving leftwards, the saw will cut a portion T1 of the thickness of the panel P, and while moving in the reverse rightward stroke the same saw will cut the remaining portion T2 of the same panel. More particularly, while moving leftward the saw S will cut into the lower portion of the thickness of the panel P whereby to affect the lower surface FI of said panel, whereas in the reverse rightward stroke said saw will cut into the remaining portion of P whereby to affect also the upper surface FS thereof. In FIG. 1 it is apparent that while moving leftwards (in the example considered here), the saw S operates on the lower surface FI of the panel P with the section of teeth comprised between the 9 o'clock and 12 o'clock positions, and, assuming the saw rotates in the direction F, it appears clearly that the material being cut thereby is submitted to compression inwards of the panel so that the resulting cut will be free from splintering. In the reverse rightward stroke, the direction of rotation F being unchanged, the saw S operates on the upper surface FS of P with the section of teeth comprised between the 12 o'clock and the 3 o'clock positions and submits the material being cut thereby to compression inwards of the panel, again avoiding any splintering.

In order to obtain a neat cut, if the material to be cut is formed by a stack of panels, the thickness of the material affected by the first cut T1 is other than the thickness or a multiple of the thickness of a single panel, so that the border between two cuts T1 and T2 will not be at two adjacent faces of two panels. Usually, when the saw S has completed its leftward stroke and has effected the cut T1, it moves entirely out of the plan view outline of the material P before rising up to the level required to effect the cut T2.

In comparison with prior art devices requiring a single stroke of a circular saw to cut a panel P, the invention requires a double stroke of the same saw. The time which is required to cover this longer distance may be shortened by increasing the speed of the horizontal translatory movement of the saw. This is possible because said saw, during each stroke, works through a thickness of material which is about one half of that cut in a conventional cutting cycle. To achieve great precision in effecting said cuts T1 and T2 and the incisions described below, the ingress of the saw into a panel P and egress therefrom may be effected with a suitable deceleration.

By operating according to the method described with reference to FIG. 1, some drawbacks may arise at the right-hand side of the panel P, where the cutting cycle is initiated and terminated, since said side would not be submitted to an inward compression by the teeth of the saw S at the beginning and at the end of the strokes effecting the cuts T1, T2. Said drawbacks may be obviated by effecting, at said side of the panel P and before the saw S begins its working cycle, one or more incisions by accurate displacement of said saw either horizontally or vertically. The side of the panel P intended to receive said incision(s) is positioned against a fixed stop A, so that it can be easily and accurately located. Thereafter, said side of the panel is released by the pressor which had clamped it on the working table L.

Some exemplary embodiments of said incisions will now be described by way of example for carrying out said incisions in the most usual operative situations.

It will be seen in FIG. 2 that if the edges of the panel P are of rounded shape, the saw S is first raised to bring its axis to the position shown at 1 so that it cannot interfere with the panel, whereafter said saw is translated horizontally toward the panel P as far as to bring its axis to the position 2 to carry out the incision N1. Thereafter, said saw is moved back horizontally from the position 2 to the position 3, whereafter it is lowered to the position 4 to carry out the incision N2. From the position 4, the saw is moved horizontally leftwards to carry out the cut T1. From the position 5, said saw is raised to the position 6 and then moved horizontally rightwards to carry out the cut T2. From the position 7, at which the cycle is completed, the saw S is lowered to the rest position to be ready for a new working cycle. It is apparent that said incisions N1 and N2 are carried out with a compression of the material inwards of the panel, and that, by virtue of said incisions, said horizontal translatory movement of the saw upon beginning and terminating the cutting cycle will not cause any splintering on the right-hand side or edge of the panel P.

Figure 3:
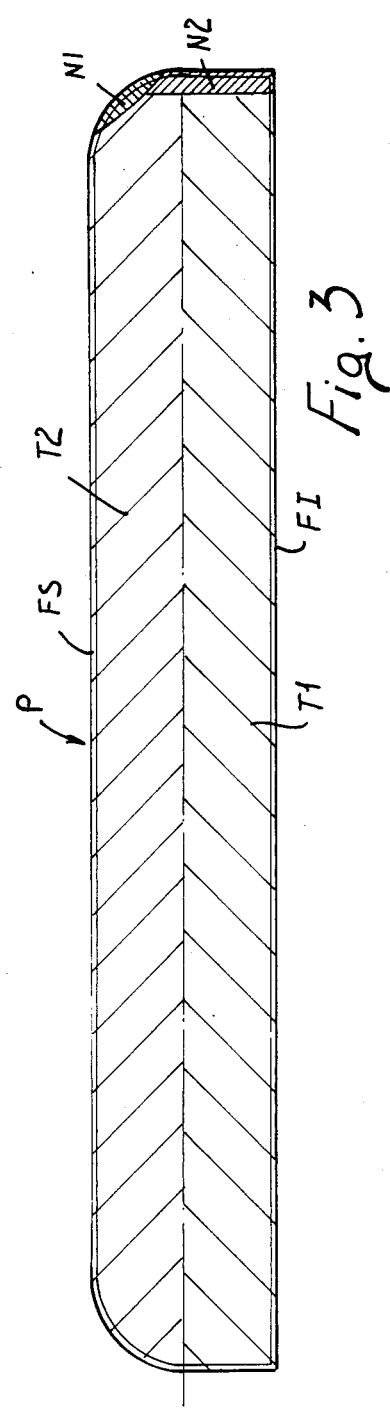

The operative movements of the saw S when a panel P has partly-rounded edges as shown in FIG. 3 are similar to those described with reference to FIG. 2. N1 and N2 indicate the two incisions or scores effected as described above. If the material P to be cut has flat and vertical edges as shown in FIG. 4, there may be effected a single incision or score N3 such as to cover the right-hand side symmetrically. For this purpose, the saw is displaced to bring its axis either to the position shown at 1, corresponding to the ideal horizontal plane midway of the thickness of the panel P, or to a position wherein said axis is below said plane, whereafter it is moved horizontally to the position 2 and then back to the position 1 and then lowered to the level which is required to effect the cut T1, or it may be lowered directly to said level with no previous reverse movement because, just as in the execution of said scores N2 in the examples of FIGS. 2 and 3, the material being scored would be submitted to compression inwardly of the panels by the teeth to compression inwardly of the panels by the teeth of the saw S. It is to be understood that in case of different configurations of the edges of the panels, said incisions or scores may be different from those described above both qualitatively and quantitatively.

It is also to be understood that, with suitable and conceivable modifications, the invention described above is to be protected as well if the saw S is usually positioned at the left-hand side of the panel P, or if the axis of rotation of the saw is located above the panel P to be cut.

A further embodiment of the carriage supporting the saw S movably as described above will now be described with reference to FIGS. 5 and 6. It can be seen in these figures that the saw S is rotatably supported, through its shaft, by the ends of a horizontal arm 10 the opposite end of which is fixed in cantilever fashion to the top end 111 of a mounting structure 11, the arrangement being such that said saw S can act on the material to be cut, either with its upper portion or with the entire front portion, which is necessary to effect said incisions N1, N2, N3. It can be seen in FIG. 6 that said arm 10 is connected to said structure 11 in a vertically adjustable manner by means of a guide-slide unit 12 through the intermediary of a cradle 13 permitting the adjustment of the saw by rotation about a vertical axis which is coincident with the axis of said saw S.

The numeral 211 indicates rectilinear rods fixed to said structure 11 and slidable with accuracy in vertical guides 14 which are secured to a structure 15 which effects the required horizontal movements of the saw-supporting carriage through precision control means of conventional construction, such as rack-and-pinion means (not shown). The means for moving the saw S horizontally and vertically will not be illustrated since it is easily conceivable and constructible by those skilled in the art. As stated above, the saw S is to be displaced with precision either vertically and horizontally. On the structure 15 there may be easily arranged precision means, for example digital control means, to provide for the vertical displacement of the structure 11.

I claim:

1. In a method of cutting panels having two faces and a thickness, in which a single circular blade saw (S) cuts a panel (P) in two strokes, by cutting through a part of its thickness (T1) during its forward stroke and through the remaining part of its thickness (T2) during its return stroke, the axis of rotation of said saw being at all times maintained on one side, i.e., below or above said panel, the direction of rotation of said saw and the inclination of teeth of said saw being such that the two faces (FIFS) of said panel which are successively acted upon during said two strokes of said saw are compressed inwardly of said panel, thereby avoiding splintering and other irregularities at the sides of the cut, the improvement comprising the step, prior to moving the saw horizontally to effect the first cut (T1), of moving the saw (S) horizontally and vertically with precision to effect at least one incision of the side of the panel facing a rest station of said saw, said incisions being made so as to subject said side to compression inward of the panel thereby avoiding splintering during entry and exit of said saw while being displaced horizontally to effect said superposed cuts (T1, T2).

2. A method according to claim 1 wherein the material to be cut comprises a stack of panels, the border between two successive cuts (T1, T2) being such as not to coincide with any contacting faces of two successive adjacent panels.

3. A method according to claim 1 wherein the horizontal displacements of said saw for effecting said superposed cuts (T1, T2) are carried out at high speed in view of the limited thickness of material to be cut by said saw during each working stroke.

4. A method according to claim 1, wherein edges of said panels are of rounded configuration, a first incision (N1) being effected in the upper portion of a side of said panel by displacing said saw horizontally, and a second incision (N2) being effected in the remaining portion of said side by displacing said saw downwards.

5. A method according to claim 1, wherein the edges of a panel to be cut are flat and vertical, only one incision (N3) being effected in the side of said panel, such incision falling short of a top surface of said panel and being carried out by displacing said saw only horizontally after said saw has been displaced to bring its axis either at or below an ideal horizontal plane located midway of the thickness of said panel to be cut.

6. A cutting machine for severing panels, said machine comprising
   (a) a single circular cutting saw (S) having an upper portion and a vertical front portion;
   (b) a vertically movable structure (11) having a top portion (111), for effecting vertical displacement of said saw;
   (c) means for rotatably mounting said saw on an end of an arm (10), and means for adjustably mounting said arm in cantilever fashion on said top portion (111);
   (d) a saw-supporting carriage and means (15) for displacing said carriage horizontally;
   (e) whereby said saw operates by its upper portion and by its entire front portion.

* * * * *